US012051232B2

(12) United States Patent
Komatsu et al.

(10) Patent No.: US 12,051,232 B2
(45) Date of Patent: *Jul. 30, 2024

(54) ANOMALY DETECTION APPARATUS, ANOMALY DETECTION METHOD, AND PROGRAM

(71) Applicant: NEC Corporation, Tokyo (JP)

(72) Inventors: Tatsuya Komatsu, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,843

(22) Filed: Jun. 5, 2023

(65) Prior Publication Data

US 2023/0316720 A1 Oct. 5, 2023

Related U.S. Application Data

(63) Continuation of application No. 17/055,802, filed as application No. PCT/JP2018/019234 on May 18, 2018, now Pat. No. 11,715,284.

(51) Int. Cl.
*G06V 10/764* (2022.01)
*G06F 18/213* (2023.01)
(Continued)

(52) U.S. Cl.
CPC .......... *G06V 10/764* (2022.01); *G06F 18/213* (2023.01); *G06F 18/214* (2023.01);
(Continued)

(58) Field of Classification Search
CPC .... G06V 10/764; G06V 10/82; G06V 10/507; G06F 18/214; G06F 18/2415; G06F 18/213
(Continued)

(56) References Cited

U.S. PATENT DOCUMENTS

| 11,715,284 B2 * | 8/2023 | Komatsu .............. G06F 18/214 |
| | | 382/195 |
| 2007/0083374 A1 | 4/2007 | Bates .................... G10L 15/197 |
| | | 704/E15.023 |

(Continued)

FOREIGN PATENT DOCUMENTS

| JP | H06-167591 A | 6/1994 |
| JP | H09-090977 A | 4/1997 |

(Continued)

OTHER PUBLICATIONS

International Search Report corresponding to PCT/JP2018/019234 mailed on Jul. 17, 2018 (2 pages).

(Continued)

*Primary Examiner* — Michael R Neff

(57) ABSTRACT

An anomaly detection apparatus extracts a circumstantial feature value for anomaly detection corresponding to a circumstantial feature value for learning from other modal signal for anomaly detection different in modal from acoustic, calculates a signal pattern feature related to an acoustic signal of anomaly detection target based on the acoustic signal of anomaly detection target, the circumstantial feature value for anomaly detection and a signal pattern model learned based on an acoustic signal for learning and the circumstantial feature value for learning calculated from other modal signal for learning, and calculates an anomaly score for performing an anomaly detection of the acoustic signal of anomaly detection target based on the signal pattern feature.

19 Claims, 6 Drawing Sheets

(51) Int. Cl.
*G06F 18/214* (2023.01)
*G06F 18/2415* (2023.01)
*G06V 10/50* (2022.01)
*G06V 10/82* (2022.01)

(52) U.S. Cl.
CPC ........ *G06F 18/2415* (2023.01); *G06V 10/507* (2022.01); *G06V 10/82* (2022.01)

(58) Field of Classification Search
USPC ........................................................ 382/195
See application file for complete search history.

(56) References Cited

U.S. PATENT DOCUMENTS

| 2015/0134947 | A1 | 5/2015 | Varcoe et al. |
| 2019/0373007 | A1 | 12/2019 | Salunke .............. G06F 11/3447 |
| 2020/0033297 | A1 | 1/2020 | Rudyk ................... G01N 29/14 |
| 2020/0035223 | A1 | 1/2020 | Asami et al. |

FOREIGN PATENT DOCUMENTS

| JP | 2002-140090 A | 5/2002 |
| JP | 2007-034788 A | 2/2007 |
| JP | 2013-025367 A | 2/2013 |
| JP | 2013-200143 A | 10/2013 |
| JP | 2014-048523 A | 3/2014 |
| JP | 2015-522998 A | 8/2015 |
| JP | 2017-194341 A | 10/2017 |
| WO | 2017/199455 A1 | 11/2017 |
| WO | WO-2018/047804 A1 | 3/2018 |
| WO | 2018/062265 A1 | 4/2018 |

OTHER PUBLICATIONS

Marchi, Erik, et al. "Deep Recurrent Neural Network-Based Autoencoders for Acoustic Novelty Detection" Computational Intelligence and Neuroscience 2017 (2017) (pp. 1-18).
Japanese Office Action for JP Application No. 2020-518911 mailed on Sep. 14, 2021 with English Translation.

* cited by examiner

ANOMALY DETECTION APPARATUS, ANOMALY DETECTION METHOD, AND PROGRAM

CROSS REFERENCE TO RELATED APPLICATIONS

This application is a Continuation of U.S. application Ser. No. 17/055,802 filed on Nov. 16, 2020, which is a national stage application of International Application No. PCT/JP2018/019234 entitled "Anomaly Detection Apparatus, Anomaly Detection Method, and Program" filed on May 18, 2018, the disclosure of which is hereby incorporated by reference in its entirety.

TECHNICAL FIELD

The present invention relates to an anomaly detection apparatus, an anomaly detection method, and program.

BACKGROUND

Regarding a sequentially inputted acoustic signal, Non-patent literature 1 (NPL 1) discloses a technology in which a detector learned with a signal pattern included in the acoustic signal at a normal state, is used as a model for a generation mechanism for generating an acoustic signal at a normal time. The technology disclosed in NPL 1 calculates an outlier score based on the detector and the signal pattern in an inputted acoustic signal to detect, as an anomaly, the signal pattern that is statistically an outlier from the generation mechanism at a normal time.

In Patent literature 1 (PTL 1), a generated model, without not over-fitting to the data used to calculate a mode, provides an accurate behavioral estimation for new data. In PTL 2, a head motion learning apparatus and a head motion synthesizer for automatic generation of a head motion that can reflect a user's sensitivity are provided.

CITATION LIST

PTL 1: Japanese Unexamined Patent Application Publication No. JP2014-048523A
PTL 2: Japanese Unexamined Patent Application Publication No. JP2007-034788A
NPL 1: Marchi, Erik, et al. "Deep Recurrent Neural Network-Based Autoencoders for Acoustic Novelty Detection." Computational intelligence and neuroscience 2017 (2017)

SUMMARY

Each disclosure of the above literatures (PTLs and NPL) mentioned at the CITATION LIST is incorporated herein by reference thereto. The following analysis has been made by the present inventors.

In the technology disclosed in NPL 1, there is a problem that an anomaly cannot be detected when the generation mechanism of the acoustic signal has multiple states and the signal patterns generated in respective states are different. For example, let's consider a case where the generation mechanism has two states, state A and state B. Furthermore, consider a case where the state A generates a signal pattern 1 and the state B generates a signal pattern 2 at a normal time, and the state A generates a signal pattern 2 and the state B generates a signal pattern 1 at an anomaly time. In this case, the technology disclosed in the NPL 1 makes modeling to generate signal pattern 1 and signal pattern 2 regardless of a state of the generation mechanism, and fails to detect an anomaly which is to be truly detected.

It is a main purpose of the present invention to provide an anomaly detection apparatus, an anomaly detection method, and a program, each contributing to detect an anomaly from acoustic signal generated by a generation mechanism accompanied by a state change.

According to a first aspect of the present invention, there is provided an anomaly detection apparatus, comprising: an anomaly detection apparatus, including:

a pattern storage part that stores a signal pattern model learned based on an acoustic signal for learning and a circumstantial feature value for learning calculated from an other modal signal for learning that is different in modal from acoustic;

a first circumstantial feature extraction part that extracts a circumstantial feature value for anomaly detection corresponding to the circumstantial feature value for learning from an other modal signal for anomaly detection that is different in modal from acoustic;

an anomaly detection feature calculation part that calculates a signal pattern feature related to an acoustic signal of anomaly detection target based on the acoustic signal of anomaly detection target, the circumstantial feature value for anomaly detection and the signal pattern model; and a score calculation part that calculates an anomaly score for performing an anomaly detection of the acoustic signal of anomaly detection target based on the signal pattern feature.

According to a second aspect of the present invention, there is provided an anomaly detection method by an anomaly detection apparatus that includes a pattern storage part that stores a signal pattern model learned based on an acoustic signal for learning and a circumstantial feature value for learning calculated from an other modal signal for learning that is different in modal from acoustic, the method including:

extracting a circumstantial feature value for anomaly detection corresponding to the circumstantial feature value for learning from an other modal signal for anomaly detection that is different in modal from acoustic;

calculating a signal pattern feature related to an acoustic signal of anomaly detection target based on the acoustic signal of anomaly detection target, the circumstantial feature value for anomaly detection and the signal pattern model; and calculating an anomaly score for performing an anomaly detection of the acoustic signal of anomaly detection target based on the signal pattern feature.

According to a third aspect of the present invention, there is provided a program causing a computer that is installed in an anomaly detection apparatus including a pattern storage part that stores a signal pattern model learned based on an acoustic signal for learning and a circumstantial feature value for learning calculated from an other modal signal for learning that is different in modal from acoustic, to execute processing including:

extracting a circumstantial feature value for anomaly detection corresponding to the circumstantial feature value for learning from an other modal signal for anomaly detection that is different in modal from acoustic;

calculating a signal pattern feature related to an acoustic signal of anomaly detection target based on the acoustic signal of anomaly detection target, the circumstantial feature value for anomaly detection and the signal pattern model; and calculating an anomaly score for performing an anomaly detection of the acoustic signal of anomaly detection target based on the signal pattern feature.

This program can be stored in a computer-readable storage medium. The storage medium may be a non-transient storage medium such as a semiconductor memory, a hard disk, a magnetic storage medium, or an optical storage medium. The present invention can be embodied as a computer program product.

According to individual aspects of the present invention, there are provided an anomaly detection apparatus, an anomaly detection method, and a program, each contributing to detect an anomaly from acoustic signal generated by a generation mechanism accompanied by a state change.

DETAILED DESCRIPTION

Figure 1:
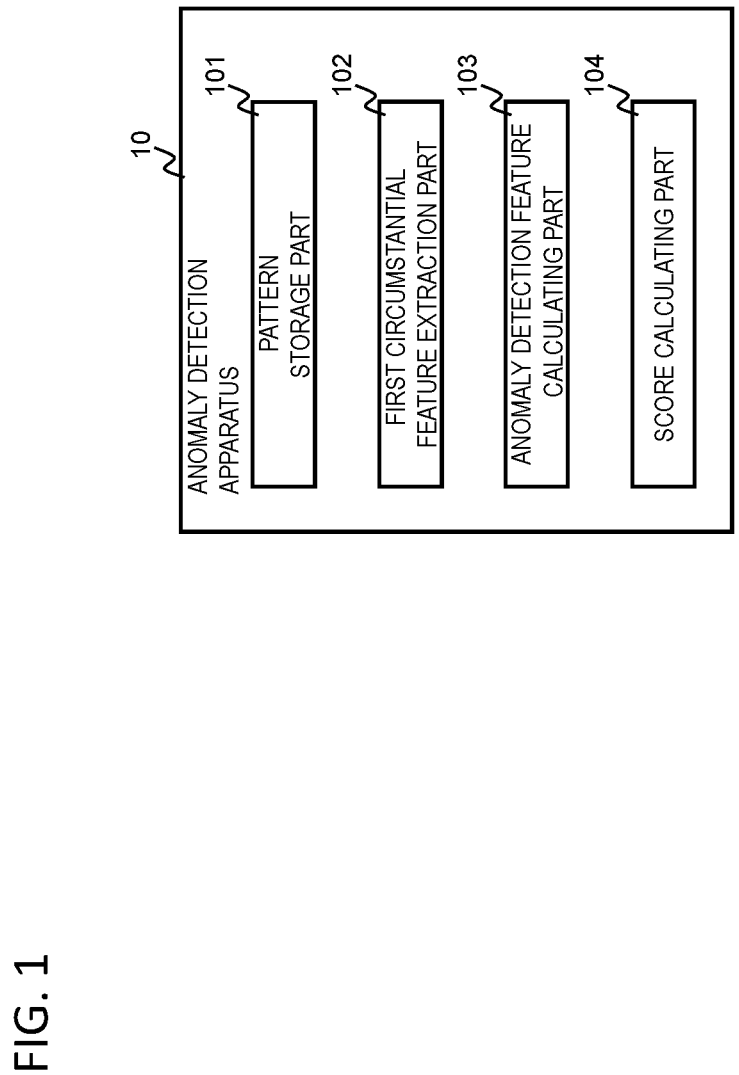
FIG. 1 is a diagram illustrating an outline of an example embodiment.

First, an outline of an example embodiment will be described. In the following outline, various components are attached with reference characters for the sake of convenience. Namely, the following reference characters are merely used as examples to facilitate understanding of the outline. Thus, the disclosure is not limited to the description of the following outline. In addition, connecting lines between blocks in each figure include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

An anomaly detection apparatus 10 according to an example embodiment includes a pattern storage part 101, a first circumstantial feature extraction part 102, an anomaly detection feature calculation part 103, and a score calculation part 104 (see FIG. 1). The pattern storage part 101 stores a signal pattern model learned based on an acoustic signal for learning and a circumstantial feature value for learning that is calculated from other modal signal for learning that is different in modal from an acoustic signal. The first circumstantial feature extraction part 102 extracts a circumstantial feature value for anomaly detection corresponding to the circumstantial feature value for learning, from other modal signal for anomaly detection that is different in modal from acoustic. The anomaly detection feature calculation part 103 calculates a signal pattern feature related to an acoustic signal of anomaly detection target based on the acoustic signal of anomaly detection target, the circumstantial feature value for anomaly detection and the signal pattern model. The score calculation part 104 calculates an anomaly score for detecting an anomaly of an acoustic signal of anomaly detection target based on the signal pattern feature.

The above described anomaly detection apparatus 10 implements an anomaly detection based on an outlier detection with respect to an acoustic signal. In addition to a signal pattern obtained from an acoustic signal, the anomaly detection apparatus 10 performs an outlier detection using a circumstantial feature value that is a feature corresponding to a state (circumstance) of the generation mechanism. Therefore, an outlier pattern can be detected in accordance with a change in a state of the generation mechanism. That is, the anomaly detection apparatus 10 can detect an anomaly from an acoustic signal generated by the generation mechanism accompanied by a state change.

Hereinafter, a concrete example embodiment will be described in more detail with reference to the drawings. In the example embodiment, like reference characters refer to like components, and description thereof will be omitted.

First Example Embodiment

A first example embodiment will be described in more detail with reference to the drawings.

Figure 2:
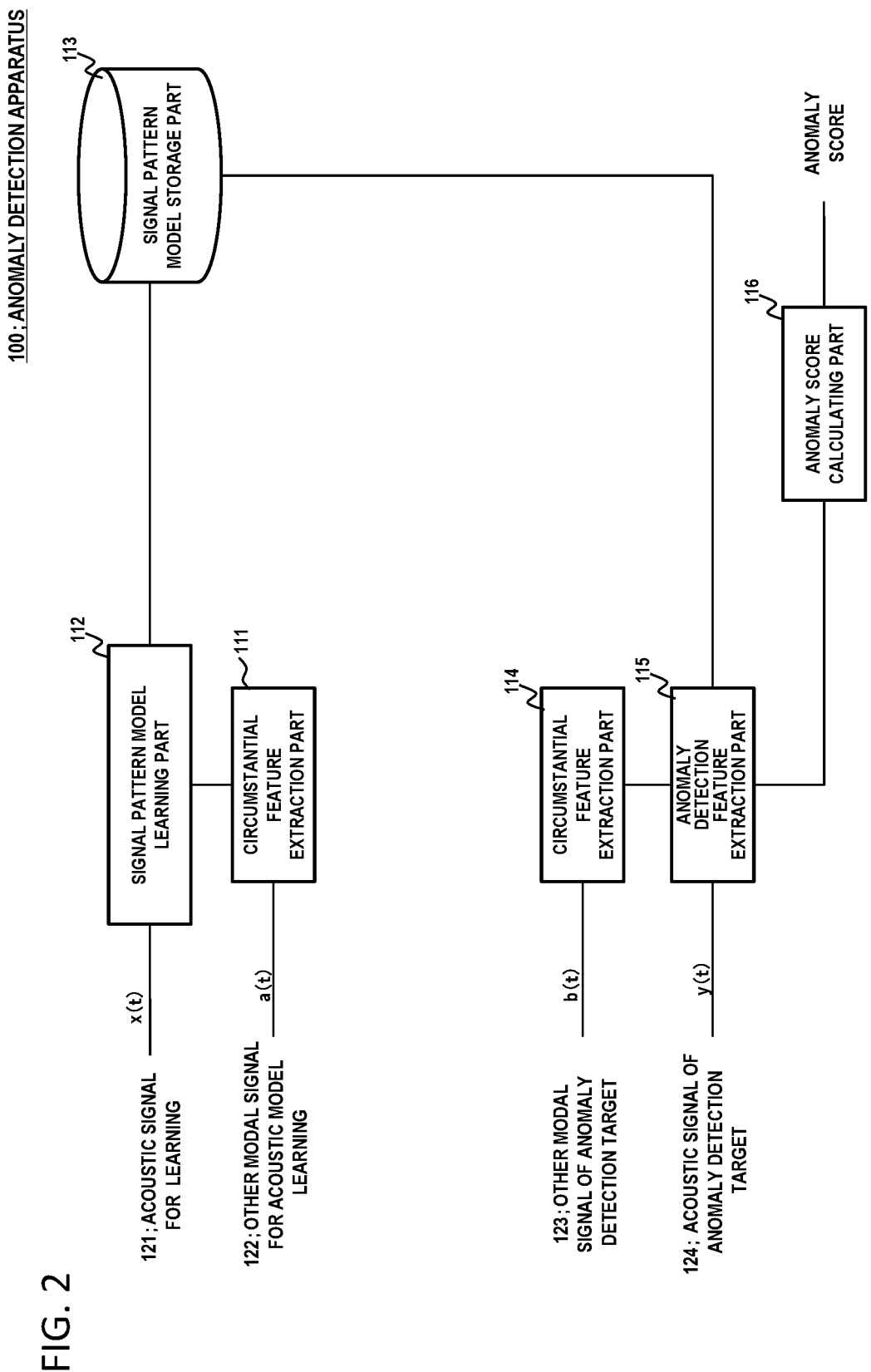
FIG. 2 is a diagram illustrating an example of a processing configuration of an anomaly detection apparatus according to a first example embodiment.

FIG. 2 is a diagram illustrating an example of a processing configuration (processing modules) of an anomaly detection apparatus 100. Referring to FIG. 2, the anomaly detection apparatus 100 includes a circumstantial feature extraction part 111, a signal pattern model learning part 112, a signal pattern model storage part 113, a circumstantial feature extraction part 114, an anomaly detection feature extraction part 115, and an anomaly score calculation part 116.

The circumstantial feature extraction part 111 receives an other modal signal for acoustic model learning 122 as an input, calculates a circumstantial feature value (circumstantial feature vector) for output to the signal pattern model learning part 112. The detail of the other modal signal and the circumstantial feature value will be described later.

The signal pattern model learning part 112 learns and outputs a signal pattern model using an acoustic signal for learning 121 and the circumstantial feature value outputted by the circumstantial feature extraction part 111 as inputs.

The signal pattern model storage part 113 stores the signal pattern model outputted by the signal pattern model learning part 112.

The circumstantial feature extraction part 114 receives an other modal signal of anomaly detection target 123 as input, calculates the circumstantial feature value, for output to the anomaly detection feature extraction part 115.

The anomaly detection feature extraction part 115 receives an acoustic signal of anomaly detection target 124 and the circumstantial feature value outputted by the circumstantial feature extraction part 114 as inputs, and calculates and outputs the signal pattern feature based on the signal pattern model stored in the signal pattern model storage part 113.

The anomaly score calculation part 116 calculates and outputs an anomaly score for performing an anomaly detection based on the signal pattern feature outputted by the anomaly detection feature extraction part 115.

The anomaly detection apparatus 100 according to the first example embodiment, when learning a signal pattern in the signal pattern model learning part 112, uses, in addition to the acoustic signal for learning 121, a circumstantial feature value outputted by the circumstantial feature extraction part 111 as an auxiliary feature.

The other modal signal for acoustic model learning 122 and the other modal signal of anomaly detection target 123 are signals in a modal different from an acoustic signal. For example, the other modal signal is a signal (of a kind different from an acoustic signal) that indicates a feature for a circumstance of a sound generation mechanism by means of a signal such as an image signal obtained from an image sensor such as a camera (not illustrated) or a vibration signal obtained from a vibration sensor (not illustrated). The other modal signal includes information that cannot be obtained from an acoustic (sound).

In the first example embodiment, a state of the generation mechanism at time t is characterized by performing statistical processing of the above other modal signals. Taking an image signal as an example, it is assumed, for example, that a target object of an anomaly detection is a particular room. In this case, by checking a histogram of luminance at each pixel that forms an image, it is possible to determine whether or not lighting is on in the room. In this example, a status of lighting (on or off) corresponds to a status of the generation mechanism (circumstance), respectively. When the lighting is on, a human speech is not an anomaly, but a fact that a human speech is recorded when the lighting is off is highly likely to indicate an anomaly. In the first example embodiment, such information is used as a circumstantial feature value for pattern model learning.

A histogram obtained from the luminance of the pixels is only an illustrative example, and any other image feature value can be used. Similarly, any other feature value can be used in the case of other modal signals other than an image signal. By using these other modal signals, it is possible to learn a pattern model that takes into account of a state of the generation mechanism. In other words, the signal pattern model learning part 112 learns a signal pattern included in the acoustic signal for learning 121, as well as information about a state of the generation mechanism in which the signal pattern has been generated, as a feature.

The circumstantial feature extraction part 114 calculates a circumstantial feature value from an other modal signal of anomaly detection target 123 in the same manner as the circumstantial feature extraction part 111.

The anomaly detection feature extraction part 115 receives the circumstantial feature value calculated from the acoustic signal of anomaly detection target 124 and the other modal signal of anomaly detection target 123 as an input, and calculates a signal pattern feature based on the signal pattern model stored in the signal pattern model storage part 113. In the first example embodiment, in addition to the acoustic signal of anomaly detection target 124, the circumstantial feature value, which is a feature corresponding to a circumstance of the generation mechanism, is used as an input, so that an outlier pattern can be detected according to a change in the circumstance of the generation mechanism.

The signal pattern feature calculated in the anomaly detection feature extraction part 115 is converted for output into an anomaly score in the anomaly score calculation part 116.

As described above, the anomaly detection technology of NPL 1 performs modeling of a generation mechanism without distinction of a state of the generation mechanism by using only a signal pattern in an input acoustic signal. As a result, the technology of the NPL 1 cannot detect a true anomaly to be detected if the generation mechanism has multiple states and statistical properties of the signal patterns generated in individual states are different.

In contrast, according to the first example embodiment, since an outlier detection is performed using, in addition to a signal pattern, a circumstantial feature value, which is a feature corresponding to a circumstance of the generation mechanism, an outlier pattern can be detected according to a change in a circumstance (state) of the generation mechanism. In other words, according to the first example embodiment, an anomaly can be detected from acoustic signal generated by the generation mechanism accompanied by a state change.

In the first example embodiment, an anomaly detection using x(t) for the acoustic signal for learning 121 and y(t) for the acoustic signal of anomaly detection target 124 will be described as an example. Here, the acoustic signals x(t) and y(t) are digital signal series obtained by AD conversion (Analog to Digital Conversion) of analog acoustic signals recorded by an acoustic sensor such as a microphone. t is an index representing time, which is a time index of the acoustic signals that are sequentially inputted with a predetermined time (e.g., a time at which the apparatus is turned on) being set as an origin t=0. Further, let a sampling frequency of each signal be Fs, the time difference between an adjacent time index t and t+1, or a time resolution, is 1/Fs.

It is a purpose of the first example embodiment to detect an anomaly signal pattern in an acoustic signal generation mechanism that changes from time to time. When considering detection of anomaly in a public space as an example of application of the first example embodiment, human activities, operation of equipment, and ambient environment or the like existing in the environment where the microphone is installed correspond to the generation mechanism of acoustic signals x(t) and y(t).

The acoustic signal x(t) is a pre-recorded acoustic signal that is used to learn the signal pattern model at a normal time. The acoustic signal y(t) is an acoustic signal which is an anomaly detection target. Here, the acoustic signal x(t) needs to include only a signal pattern in a normal (non-anomaly) time, but if a signal pattern in an anomaly time is less than a signal pattern at a normal time, the acoustic signal x(t) can be statistically regarded as an acoustic signal at a normal time.

A signal pattern is a pattern of an acoustic signal series at a pattern length T set at a predetermined time width (e.g., 0.1 second or 1 second). The signal pattern vector $X(t1)$ at time t1 of the acoustic signal x(t) can be expressed as $X(t1)=[x(t1-T+1), x(t1)]$ using t1 and T.

In the first example embodiment, a(t) is used for the other modal signal for acoustic model learning 122 and b(t) for the other modal signal of anomaly detection target 123. The t of these other modal signals is an index of time and corresponds to time indexes of the acoustic signals x(t) and y(t). In other words, if the time index t is the same, the other modal signals (image signal, vibration signal, etc.) at the same time (timing) are inputted to the circumstantial feature extraction parts 111 and 114, respectively. The signal pattern of the other modal signal is also determined in the same way as the acoustic signal. For example, the signal pattern vector $A(t1)$ of the other modal signal a(t) at time t1 can be expressed as $A(t1)=[a(t1-T+1), a(t1)]$. As with the acoustic signal x(t), the other modal signal a(t) must contain only the signal pattern for normal (non-anomaly) times only. However, if the signal pattern in an anomaly time is smaller (or less) than the signal pattern in the normal time, the other modal signal a(t) can be considered as an acoustic signal at a normal time.

In the first example embodiment, an anomaly signal pattern is detected based on the signal pattern model learned using the signal pattern vectors X(t) and A(t) at a normal time.

The operation of the anomaly detection apparatus 100 according to the first example embodiment will be described below.

The acoustic signal x(t), which is the acoustic signal for learning 121, is inputted to the signal pattern model learning part 112. The other modal signal a(t), which is the other modal signal for acoustic model learning 122, is inputted to the circumstantial feature extraction part 111.

The circumstantial feature extraction part 111 receives the other modal signal a(t) as an input and outputs a circumstantial feature vector h(t). More specifically, the circumstantial feature extraction part 111 calculates a predetermined feature value from the other modal signal a(t) at time t. Subsequently, the circumstantial feature extraction part 111 generates a vector with the features calculated from time (t−T+1) to time t as elements. The generated vector is the circumstantial feature vector h(t). In other words, the circumstantial feature vector h(t) is calculated by applying a predetermined feature value calculation process to the signal pattern vector A(t). The circumstantial feature vector h(t) represents a statistical feature of what signal pattern the generator mechanism generates at time t. The feature vector h(t) is calculated as the signal pattern vector A(t). That is, it can be said that the circumstantial feature vector h(t) is a feature that represents a circumstance of the generation mechanism at time t when the signal pattern vector X(t) is generated.

The above predetermined feature calculation process is selected according to the type of other modal signal and the application of the system. For example, if the other modal signal is an image signal, the circumstantial feature extraction part 111 calculates a histogram based on luminance of each pixel.

The signal pattern model learning part 112 performs modeling of the signal pattern X(t) using the acoustic signal x(t) and the circumstantial feature vector h(t) outputted by the circumstantial feature extraction part 111.

The modeling method is described in the present disclosure using "WaveNet," a type of neural network. WaveNet is a predictor that receives a signal pattern X(t)=[x(t−T+1), . . . , x(t)] at time t as input and estimates a probability distribution p(x(t+1)) that the acoustic signal x(t+1) at time(t+1) follows.

In the first example embodiment, the probability distribution p(x(t+1)) of x(t+1) is defined by using the input signal pattern X(t) plus a circumstantial feature value (circumstantial feature vector) h(t) as an auxiliary feature. In other words, WaveNet is represented by the probability distribution according to the following formula 1 conditioned by the signal pattern X(t) and the circumstantial feature vector h(t).

$$p(x(t+1)) \sim p(x(t+1)|X(t),h(t),\Theta) \qquad \text{[Expression 1]}$$

The Θ is a model parameter. In WaveNet, the acoustic signal x(t) is quantized to the C dimensions by a μ-law algorithm and expressed as c(t), whereby p(x(t+1)) is expressed as a probability distribution p(c(t+1)) on a discrete set of C dimensions. Here, c(t) is a value of the acoustic signal x(t) quantized to the C dimensions at time t, and is a random variable taking a value of a natural number from 1 to C.

The inference of the model parameter Θ of p(c(t+1)|X(t), h(t)), is performed such that a cross entropy between p(c(t+1)|X(t), h(t)), calculated from X(t) and h(t), and a true value c(t+1) is minimized. The cross entropy to be minimized can be expressed by the following Expression 2.

$$E = \sum_t \sum_c c(t+1)\log p(c(t+1) \mid X(t), h(t), \Theta) \qquad \text{[Expression 2]}$$

In the first example embodiment, the circumstantial feature vector h(t) is used as an auxiliary feature in addition to the signal pattern X(t) for the estimation of the probability distribution p(x(t+1)), which is a signal pattern model. In other words, not only a signal pattern contained in an acoustic signal for learning, but also information about a circumstance of the generation mechanism in which the signal pattern has been generated is learned as a feature. Therefore, a signal pattern model can be learned according to a circumstance of the generation mechanism. The learned model parameter Θ is outputted to the signal pattern model storage part 113.

In the first example embodiment, the predictor of x(t+1) using the signal pattern X(t) based on WaveNet is described as an example of a signal pattern model, but it can also be modeled as a predictor of the signal pattern model shown in Expression 3 below.

$$X(t+1)=f(X(t),h(t),\Theta) \qquad \text{[Expression 3]}$$

The pattern model may also be estimated as a projection function from X(t) to X(t) as shown in Expressions. 4 and 5 below. In that case, the estimation of f(X(t), h(t)) may be modeled by a neural network model such as an autoencoder or a factorization technique such as a non-negative matrix factorization or PCA (Principal Component Analysis).

$$X(t)=f(X(t),h(t),\Theta) \qquad \text{[Expression 4]}$$

$$x(t)=f(X(t),h(t),\Theta) \qquad \text{[Expression 5]}$$

The signal pattern model storage part 113 stores the parameters Θ of the signal pattern model outputted by the signal pattern model learning part 112.

When an anomaly is detected, the acoustic signal y(t), which is the acoustic signal of anomaly detection target 124, is inputted to the anomaly detection feature extraction part 115. The other modal signal b(t), which is the other modal signal of anomaly detection target 123 is inputted to the circumstantial feature extraction part 114.

The circumstantial feature extraction part 114 operates in the same manner as the circumstantial feature extraction part 111. The circumstantial feature extraction part 114 outputs the circumstantial feature value (circumstantial feature vector) h_y(t) of the acoustic signal y(t).

The anomaly detection feature extraction part 115 receives, as input, the acoustic signal y(t), the circumstantial feature h_y(t), and the parameter Θ of the signal pattern model stored in the signal pattern model storage part 113. The anomaly detection feature extraction part 115 calculates a signal pattern feature about the signal pattern Y(t)=[y(t−T), . . . , y(t)] of the acoustic signal y(t).

In the first example embodiment, with respect to the signal pattern model, it is represented by a predictor to estimate the probability distribution p(y(t+1)) that the acoustic signal y(t+1) follows at time t+1, using the signal pattern Y(t) at time t as input (the following Expression 6).

$$p(y(t+1)) \sim p(y(t+1)|Y(t), h\_y(t), \Theta)$$ [Expression 6]

Let c_y(t) denote the acoustic signal y(t) quantized to the C-dimensions by a μ-law algorithm, as similarly to the signal pattern model learning part 112, the above Expression 6, as for the acoustic signal y(t+1), can be expressed as the following Expression 7.

$$p(c\_y(t+1)) \sim p(c\_y(t+1)|Y(t), h\_y(t), \Theta)$$ [Expression 7]

This is the predicted distribution of c_y(t+1) based on the signal pattern model, under a condition that the signal pattern Y(t) and the state feature value h_y(t) are obtained at time t.

Here, at the time of learning, the parameter(s) Θ of the signal pattern model is learned from the signal pattern X(t) and the circumstantial feature value h(t) so that an accuracy of estimating c(t+1) becomes high. Therefore, a predictive distribution p(c(t+1)|X(t), h(t), and Θ) at a time when the signal pattern X(t) and the circumstantial feature value h(t) are inputted becomes such a probability distribution that has the highest probability at the true value c(t+1).

Now consider the signal pattern Y(t) and the circumstantial feature value h_y(t) of the signal of anomaly detection target. In this case, if there is one similar to Y(t) conditioned to h_y(t) in a signal pattern X(t) conditioned to h(t) in the learning signal, then it is thought that p(c_y(t+1)|Y(t), h_y(t), and Θ) would have such a probability distribution that has a high probability at the true value c(t+1) corresponding to the X(t) and h(t) used for learning.

On the other hand, if Y(t) conditioned to h_y(t), which is less similar to any of the X(t) conditioned to h(t) in the learning signal, is inputted, that is, if Y(t) and h_y(t) are outliers compared to X(t) and h(t) at the time of learning, the prediction of p(c_y(t+1) Y(t), h_y(t), and Θ) will be uncertain. In other words, it is considered to be a flat distribution. That is, by checking the distribution of p(c_y(t+1)|Y(t), h_y(t), Θ), it is possible to measure out whether the signal pattern Y(t) is an outlier or not.

In the first example embodiment, a signal pattern feature z(t) is used as a signal pattern feature z(t), which is expressed as a series of probability values in each case of a natural number from 1 to C, which is a value that c_y(t+1) can take. That is, the signal pattern feature z(t) is a vector of the C dimensions represented by the following Expression 8.

$$z(t) = [p(1|Y(t), h_{y(t)}, \Theta), \ldots, p(C|Y(t), h_{y(t)}, \Theta)]$$ [Expression 8]

The signal pattern feature z(t) calculated by the anomaly detection feature extraction part 115 is converted for output to an anomaly score e(t) in the anomaly score calculation part 116. The signal pattern feature z(t) is a discrete distribution on a probability variable c that takes a value from 1 to C. If the probability distribution has a sharp peak, i.e., low entropy, then Y(t) is not an outlier. In contrast, if the probability distribution is close to a uniform distribution, that is, if the entropy is high, Y(t) is considered to be an outlier.

In the first example embodiment, the entropy calculated from the signal pattern feature z(t) is used to calculate the anomaly score e(t) (see the following Expression 9).

$$e(t) = -\sum_c z(t) \log z(t) =$$ [Expression 9]

-continued
$$-\sum_c p(c | Y(t), h_{y(t)}, \Theta) \log p(c | Y(t), h_{y(t)}, \Theta)$$

When the signal pattern Y(t) contains a signal pattern similar to the learning signal, p(c|Y(t), h_y(t), Θ) has a sharp peak, that is, entropy e(t) is low. When the signal pattern Y(t) is an outlier that does not contain a signal pattern similar to the learning signal, p(c|Y(t), h_y(t), Θ) becomes uncertain and close to a uniform distribution, i.e., the entropy e(t) is high.

Based on the anomaly score e(t) obtained, an anomaly acoustic signal pattern is detected. In detection, the a threshold processing can be performed to determine the presence or absence of the anomaly, or the anomaly score e(t) can be used as a time-series signal to which further statistical or other processing can be added.

Figure 3:
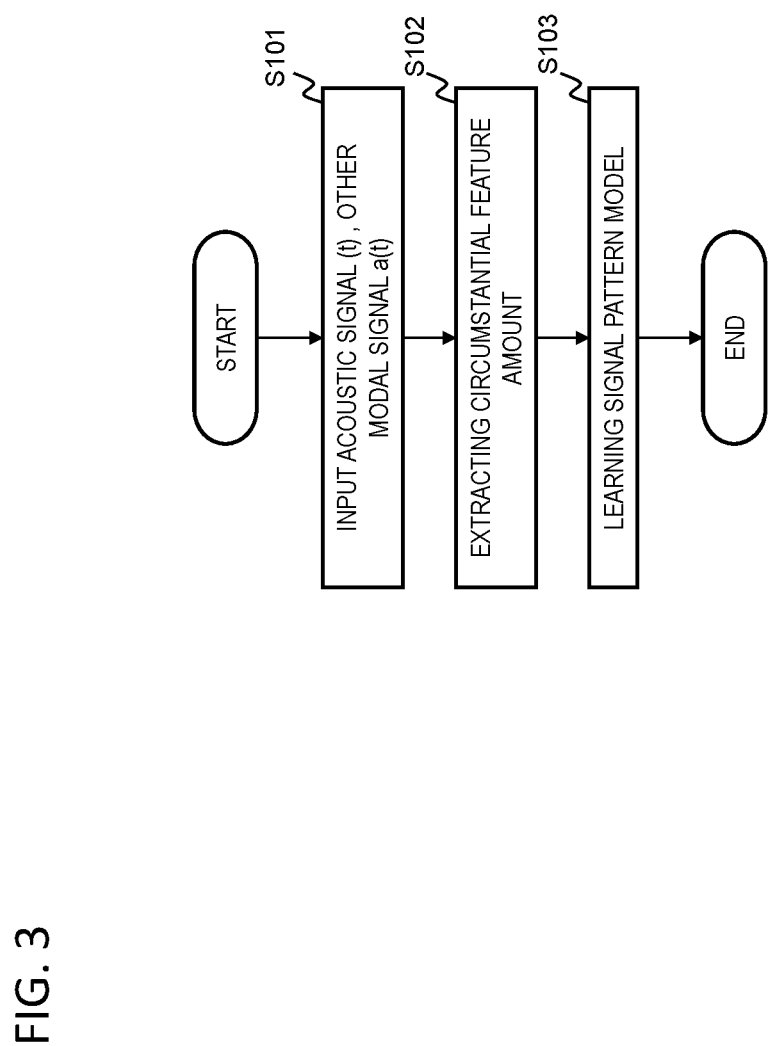
FIG. 3 is a flowchart illustrating the operation of the anomaly detection apparatus according to the first example embodiment.
Figure 4:
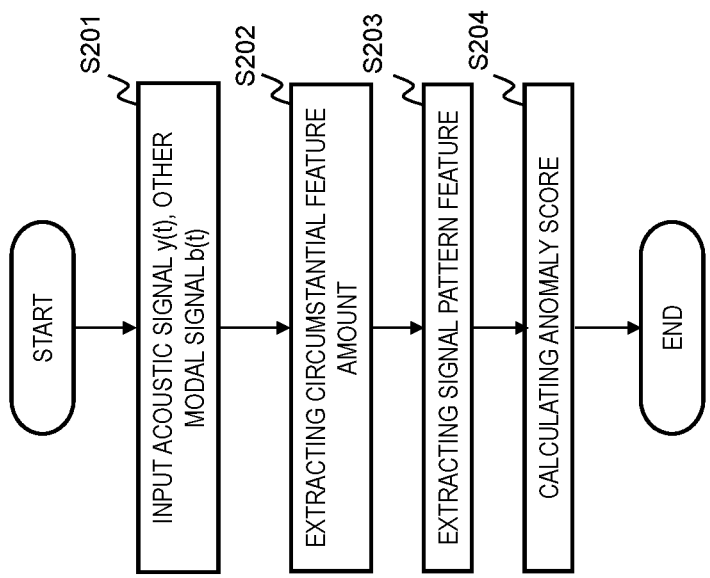
FIG. 4 is a flowchart illustrating an operation of the anomaly detection apparatus according to the first example embodiment.

The operation of the anomaly detection apparatus 100 in the first example embodiment above can be summarized as illustrated in flowcharts in FIG. 3 and FIG. 4.

FIG. 3 illustrates an operation during generation of a learning model, and FIG. 4 illustrates an operation during an anomaly detection process.

Initially, in the learning phase illustrated FIG. 3, the anomaly detection apparatus 100 inputs the acoustic signal x(t) and other modal signal a(t) (step S101). The anomaly detection apparatus 100 extracts the circumstantial feature value for learning (step S102). The anomaly detection apparatus 100 learns a signal pattern based on the acoustic signal x(t) and the circumstantial feature value for learning (generating a signal pattern model; step S103). The generated signal pattern model is stored in the signal pattern model storage part 113.

Next, in the anomaly detection phase shown in FIG. 4, the anomaly detection apparatus 100 inputs the acoustic signal y (t) and other modal signal b (t) (step S201). The anomaly detection apparatus 100 extracts the circumstantial feature value for anomaly detection (step S202). The anomaly detection apparatus 100 extracts (calculates) the signal pattern features based on the acoustic signal y (t) and the circumstantial feature value for detecting the anomaly (step S203). The anomaly detection apparatus 100 calculates the anomaly score based on the signal pattern features (step S204).

The anomaly detection technology disclosed in NPL 1 uses only the signal pattern in the inputted acoustic signal to perform modeling of the generator mechanism without distinguishing the states of the generator mechanism. Therefore, if the generator has multiple states and statistical properties of the signal pattern generated in respective states are different, the anomaly to be truly detected cannot be detected.

On the other hand, according to the first example embodiment, since the outlier detection is performed by using, in addition to a signal pattern, a circumstantial feature value, which is a feature corresponding to a state of the generation mechanism, an outlier pattern can be detected according to a change in a state of the generation mechanism. That is, according to the first example embodiment, an anomaly can be detected from an acoustic signal generated by the generation mechanism accompanied by a state change.

Second Example Embodiment

Next, a second example embodiment will be described in detail with reference to the drawings.

Figure 5:
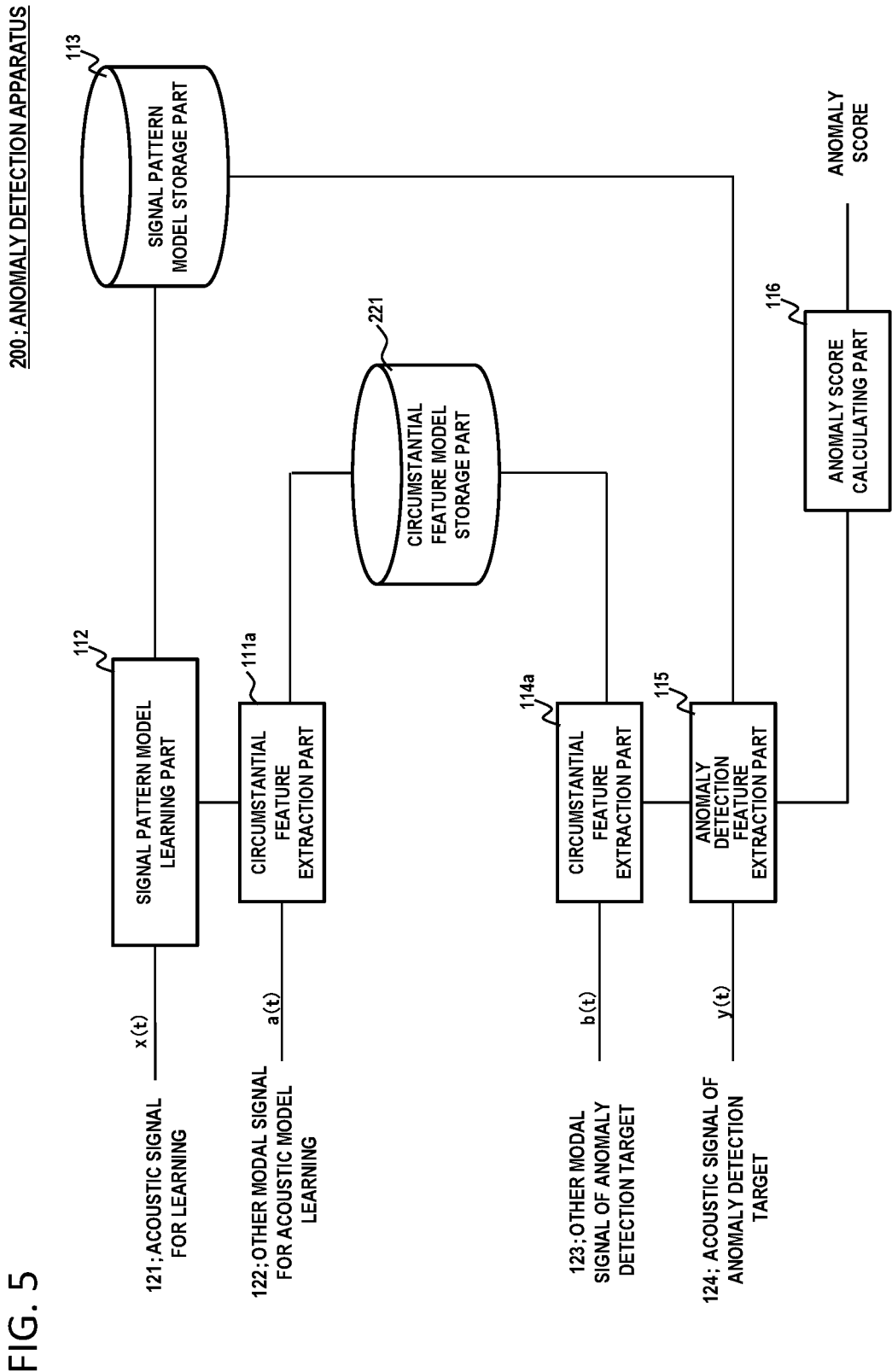
FIG. 5 is a diagram illustrating an example of a processing configuration of an anomaly detection apparatus according to a second example embodiment.

FIG. 5 is a diagram illustrating an example of a processing configuration (processing module) of an anomaly detection apparatus 200 according to the second example embodiment. Referring to FIG. 2 and FIG. 5, the anomaly detection apparatus 200 in the second example embodiment is further comprising a circumstantial feature model storage part 221.

In the first example embodiment, modeling without use of training data is explained with respect to circumstantial feature value extraction. In the second example embodiment, a case in which a circumstantial feature is extracted using a circumstantial signal model will be described. More specifically, an operation of the circumstantial feature model storage part 221 and modified parts of the circumstantial feature extraction parts 111a and 114a will be described.

The circumstantial feature model storage part 221 stores a circumstantial feature model H that serves as a reference for extracting a circumstantial feature value in the circumstantial feature extraction part 111a. The circumstantial feature model H stores one or more models that can be used as a reference for the generation mechanism of the acoustic signal of anomaly detection target.

For example, consider a case where the other modal signal is an image signal. In addition, the anomaly detection target is assumed to be a particular room. In this case, a model for counting the number of humans in an image is set up as a circumstantial feature model.

The circumstantial feature extraction part 111a checks the circumstantial feature model stored in the circumstantial feature model storage part 221, and calculates the number of human beings present in the image signal (other modal signal for acoustic model learning) as the circumstantial feature value. The calculated circumstantial feature value is used for learning in the signal pattern model learning part 112, as in the first example embodiment. As a result, a normal pattern of the acoustic signal according to the number of humans can be learned.

The circumstantial feature extraction part 114a also calculates the circumstantial feature value in the same way as the circumstantial feature extraction part 111a. The circumstantial feature value is reflected in the generation of the signal pattern features and the calculation of the anomaly score. As a result, it is possible to detect an anomaly such that a human speech is recorded even though the number of humans present in the room is zero.

The above image signal is an example, and other modal signal can be used. For example, in the example where the target is (circumstance) in a room, a signal obtained from a floor pressure sensor may be used as the other modal signal. For example, if a human being is present in the room, the floor is under pressure and thus the acoustic signal caused by the human movement is considered to be recorded. However, if there is no pressure on the floor, but the acoustic signal caused by human movement is recorded, it is considered to be anomalous, etc.

In the second example embodiment, instead of defining the above mentioned relationship by a rule, other modal signals as auxiliary features, are used as circumstantial feature value in combination with the acoustic signal, so that an anomalous acoustic signal pattern can be detected from the generation mechanism providing state change according to the circumstance.

[Hardware Configuration]

A hardware configuration of the anomaly detection apparatus described in the above example embodiments will be described.

Figure 6:
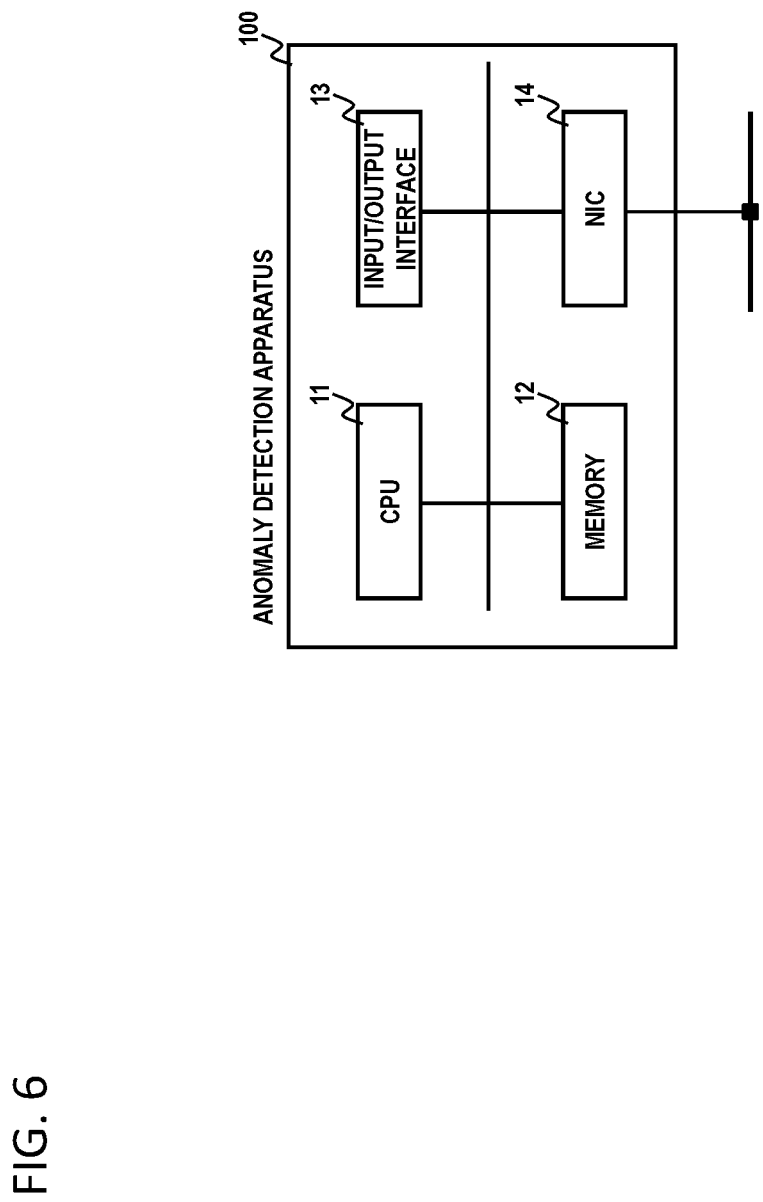
FIG. 6 is a diagram illustrating an example of a hardware configuration of an anomaly detection apparatus according to the first example embodiment and the second example embodiment.

FIG. 6 is a diagram illustrating an example of a hardware configuration of the anomaly detection apparatus 100. The anomaly detection apparatus 100 is implemented by a so-called information processing apparatus (computer) and has the configuration as illustrated in FIG. 6. For example, the anomaly detection apparatus 100 has a central processing unit (CPU) 11, a memory 12, an input/output interface 13, a network interface card (NIC) 14, etc., which are interconnected by an internal bus, and the like. The configuration illustrated in FIG. 6 is not intended to limit the hardware configuration of the anomaly detection apparatus 100. The anomaly detection apparatus 100 may also include any hardware not illustrated, and may not be equipped with the NIC 14 and the like as necessary.

The memory 12 is RAM (Random Access Memory), ROM (Read Only Memory), HDD (Hard Disk Drive), etc.

The input/output interface 13 is a means of an interface to an input/output apparatus not illustrated. The input/output apparatus includes, for example, a display apparatus, an operation apparatus, and the like. The display apparatus is, for example, a liquid crystal display or the like. An operation apparatus is, for example, a keyboard, a mouse, and the like. The interface connected to the acoustic sensor(s) and the like is also included in the input/output interface 13.

Each processing module of the above described anomaly detection apparatus 100 is implemented, for example, by the CPU 11 executing a program(s) stored in the memory 12. The program can be downloaded over a network or updated by using a storage medium storing the program. Further, the above processing module may be implemented by a semiconductor chip. That is, there may be means of executing the functions performed by the above processing modules in some hardware and/or software.

Other Embodiments (Variations)

Although the application disclosure has been described above with reference to example embodiments, the application disclosure is not limited to the above example embodiments. The configurations and details of the application may be modified in various ways that are within a scope of the application disclosure and are understandable to those skilled in the art. Also, any system or apparatus that combines the separate features included in each example embodiment in any way is included within the scope of the disclosure of the present application.

For example, although image and pressure sensor signals are described as examples of other modal signals, a door open/close sensor, time series temperature signal obtained from a temperature sensor, time series data of power consumption, etc. may also be used. Alternatively, series data of power consumption by each customer, time series data of call volume in a network, time series data of air flow, spatial series data of rainfall in a certain range, and other discrete series data such as angle series data, text or the like can be used. Series data as a matter of course, includes not only equally spaced series data but also unequally spaced series data.

In the above example embodiments, the configuration including a module for learning within the anomaly detection apparatus 100 and the like is explained, but the signal pattern model may be learned by another apparatus and the learned model may be installed to the anomaly detection apparatus 100 and the like.

Also, by installing the anomaly detecting program in the memory part of a computer, the computer can be caused to function as an anomaly detection apparatus. The anomaly detection method can be executed by the computer by having the computer execute the anomaly detecting program.

Moreover, in the plural flowcharts used in the above-mentioned explanation, the plural processes (processing) are described in order, but the order of execution of the processes executed in each embodiment is not limited to the order in which they are described. In each embodiment, the order of the illustrated processes can be changed to the extent that it does not interfere with the content, for example, by executing each process in parallel. Each of the above example embodiments can be combined to the extent that they do not conflict with each other in content.

Furthermore, the present application disclosure may be applied to a system comprising a plurality of apparatuses, or to a single apparatus. Also, the disclosure of the present application may be applicable to cases where an information processing program that realizes the functions of example embodiments are supplied directly or remotely to a system or apparatus. Thus, a program installed on a computer, or a medium storing the program, or a World Wide Web (WWW) server that causes the program to be downloaded in order to achieve the functions of the present application disclosure on a computer is also included in the scope of the present application disclosure. In particular, at least a non-transitory computer readable medium storing a program that causes a computer to perform the processing steps included in the above described embodiments are included in the scope of the disclosure of this application.

Each disclosure of the above PTLs and so on is incorporated herein by reference thereto. Variations and adjustments of the example embodiments and examples are possible within the scope of the disclosure (including the claims) of the present invention and based on the basic technical concept of the present invention. Various combinations and selections of various disclosed elements (including the elements in the claims, example embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not explicitly disclose arbitrary numerical values or small ranges included in the ranges, these values and ranges should be deemed to have been concretely disclosed.

The invention claimed is:

1. An anomaly detection apparatus, comprising:
a processor; and
a memory in circuit communication with the processor;
a first storage that stores a signal pattern model learned based on an acoustic signal for learning and a circumstantial feature value for learning calculated from an other modal signal for learning that has a modality different than an acoustic modality, the first storage in circuit communication with the processor; and
a second storage that stores a circumstantial feature model serving as a reference for extraction of at least a circumstantial feature value for anomaly detection, the second storage in circuit communication with the processor,
wherein the processor, when executing program instructions stored in the memory:
receives the other modal signal for anomaly detection that has the modality different than the acoustic modality to extract the circumstantial feature value for anomaly detection corresponding to the circumstantial feature value for learning from the other modal signal for anomaly detection;
extracts the circumstantial feature value for anomaly detection using the circumstantial feature model stored in the second storage;
receives an acoustic signal of an anomaly detection target and reads the signal pattern model from the first storage to calculate a signal pattern feature related to the acoustic signal of the anomaly detection target based on the acoustic signal of the anomaly detection target, the circumstantial feature value for anomaly detection, and the signal pattern model; and
calculates an anomaly score for performing anomaly detection of the acoustic signal of the anomaly detection target based on the signal pattern feature.

2. The anomaly detection apparatus according to claim 1, wherein the signal pattern model is a predictor that receives an input of the acoustic signal of the anomaly detection target at time t, and predicts a probability distribution that the acoustic signal of the anomaly detection target at time t+1 that follows.

3. The anomaly detection apparatus according to claim 1, wherein
the processor, when executing the program instructions stored in the memory, calculates an entropy of the signal pattern feature and calculates the anomaly score using the calculated entropy.

4. The anomaly detection apparatus according to claim 1, wherein the acoustic signal for learning and the acoustic signal of the anomaly detection target are generated by a generation mechanism accompanied by change of state.

5. The anomaly detection apparatus according to claim 1, wherein the processor, when executing the program instructions stored in the memory,
extracts the circumstantial feature value for learning; and
learns the signal pattern model based on the acoustic signal for learning and the circumstantial feature value for learning.

6. The anomaly detection apparatus according to claim 1, wherein the other model signal that has the modality different than the acoustic modality is at least one of an image signal, a vibration signal, and a pressure sensor signal.

7. An anomaly detection method performed by an anomaly detection apparatus comprising a first storage and a second storage, wherein
the first storage stores a signal pattern model learned based on an acoustic signal for learning and a circumstantial feature value for learning calculated from an other modal signal for learning that has a modality different than an acoustic modality,
the second storage stores a circumstantial feature model serving as a reference for extraction of at least a circumstantial feature value for anomaly detection, and
the method comprises:
receiving the other modal signal for anomaly detection that has the modality different than the acoustic modality to extract the circumstantial feature value for anomaly detection corresponding to the circumstantial feature value for learning from the other modal signal for anomaly detection;
extracting the circumstantial feature value for anomaly detection using the circumstantial feature model stored in the second storage;
receiving an acoustic signal of an anomaly detection target and reads the signal pattern model from the first storage to calculate a signal pattern feature related to the acoustic signal of the anomaly detection target based on the acoustic signal of the anomaly detection target, the circumstantial feature value for anomaly detection, and the signal pattern model; and calculating an anomaly score for performing anomaly detection of the acoustic signal of the anomaly detection target based on the signal pattern feature.

8. A non-transitory computer-readable storage medium storing a program causing an anomaly detection apparatus comprising a first storage and a second storage to perform processing, wherein the first storage stores a signal pattern model learned based on an acoustic signal for learning and a circumstantial feature value for learning calculated from an other modal signal for learning that has a modality different than an acoustic modality, the second storage that stores a circumstantial feature model serving as a reference for extraction of at least a circumstantial feature value for anomaly detection, and the processing comprises:

receiving the other modal signal for anomaly detection that has the modality different than the acoustic modality to extract the circumstantial feature value for anomaly detection corresponding to the circumstantial feature value for learning from the other modal signal for anomaly detection;

extracting the circumstantial feature value for anomaly detection using the circumstantial feature model stored in the second storage;

receiving an acoustic signal of an anomaly detection target and reads the signal pattern model from the first storage to calculate a signal pattern feature related to the acoustic signal of the anomaly detection target based on the acoustic signal of the anomaly detection target, the circumstantial feature value for anomaly detection, and the signal pattern model; and calculating an anomaly score for performing anomaly detection of the acoustic signal of the anomaly detection target based on the signal pattern feature.

9. The anomaly detection apparatus according to claim 1, wherein the processor, when executing the program instructions stored in the memory, receives the other modal signal for learning to calculate the circumstantial feature value;

receives the acoustic signal for learning to learn the signal pattern model using the acoustic signal for learning and the circumstantial feature value; and stores the signal pattern model in the first storage.

10. The anomaly detection method according to claim 7, wherein the signal pattern model is a predictor that receives an input of the acoustic signal of the anomaly detection target at time t, and predicts a probability distribution that the acoustic signal of the anomaly detection target at time t+1 that follows.

11. The anomaly detection method according to claim 7, comprising obtaining the anomaly score by calculating an entropy of the signal pattern feature.

12. The anomaly detection method according to claim 7, wherein the acoustic signal for learning and the acoustic signal of the anomaly detection target are generated by a generation mechanism accompanied by change of state.

13. The anomaly detection method according to claim 7, comprising:

extracting the circumstantial feature value for learning; and performing learning of the signal pattern model based on the acoustic signal for learning and the circumstantial feature value for learning.

14. The anomaly detection method according to claim 7, wherein the other model signal that has the modality different than the acoustic modality is at least one of an image signal, a vibration signal, and a pressure sensor signal.

15. The non-transitory computer-readable storage medium according to claim 8, wherein the signal pattern model is a predictor that receives an input of the acoustic signal of the anomaly detection target at time t, and predicts a probability distribution that the acoustic signal of the anomaly detection target at time t+1 that follows.

16. The non-transitory computer-readable storage medium according to claim 8, wherein the processing comprises:

wherein the program causes the computer to execute:

obtaining the anomaly score by calculating an entropy of the signal pattern feature.

17. The anomaly detection apparatus according to claim 2, wherein the signal pattern feature is expressed as a series of values of probabilities for respective possible values of the acoustic signal of the anomaly detection target at the time t+1.

18. The anomaly detection method according to claim 10, wherein the signal pattern feature is expressed as a series of values of probabilities for respective possible values of the acoustic signal of the anomaly detection target at the time t+1.

19. The non-transitory computer-readable storage medium according to claim 15, wherein the signal pattern feature is expressed as a series of values of probabilities for respective possible values of the acoustic signal of the anomaly detection target at the time t+1.

* * * * *